United States Patent [19]
Higaki et al.

[11] Patent Number: 5,517,276
[45] Date of Patent: May 14, 1996

[54] ACTIVE DISTANCE MEASURING APPARATUS WITH THE REMOTE CONTROL FUNCTION

[75] Inventors: Riichi Higaki, Kawasaki; Toru Kosaka, Zama; Yoshikazu Iida, Chigasaki; Hiroyuki Tsuru, Tokyo, all of Japan

[73] Assignee: Nikon Corporation, Tokyo, Japan

[21] Appl. No.: 480,385

[22] Filed: Jun. 7, 1995

Related U.S. Application Data

[63] Continuation of Ser. No. 372,837, Jan. 13, 1995, abandoned, which is a continuation of Ser. No. 239,842, May 9, 1994, abandoned, which is a continuation of Ser. No. 835,322, Feb. 14, 1992, abandoned.

[30] Foreign Application Priority Data

Mar. 25, 1991 [JP] Japan ..................................... 3-084718

[51] Int. Cl.⁶ .................................................. G03B 13/36
[52] U.S. Cl. .......................... 354/403; 354/266; 354/131
[58] Field of Search ..................................... 354/403, 266, 354/131

[56] References Cited

U.S. PATENT DOCUMENTS

| | | | |
|---|---|---|---|
| 4,534,629 | 8/1985 | Bogle et al. | 354/400 |
| 4,601,557 | 7/1986 | Bogle et al. | 354/460 |
| 5,006,700 | 4/1991 | Kosaka et al. | 354/403 X |
| 5,014,080 | 5/1991 | Miyadera | 354/403 |

FOREIGN PATENT DOCUMENTS 2-135310  5/1990  Japan .

*Primary Examiner*—Russell E. Adams
*Attorney, Agent, or Firm*—Shapiro and Shapiro

[57] ABSTRACT

An active distance measuring apparatus with the remote control function is provided with a plurality of light projecting portions, a plurality of light receiving portions, a distance measuring device for effecting active distance measurement at one or more points in an image field by the use of all or some of the plurality of light projecting portions and the plurality of light receiving portions, and a remote control for performing, when the light receiving portions receive signal light from a remote control transmitter, a predetermined remote control operation by the use of the output of the light receiving portion which has received the signal light, the distance measuring device distance-measuring a distance measuring point corresponding to the light receiving portion which has received the signal light from the remote control transmitter. By the light receiving portions for active distance measurement being used also as the light receiving portions of the remote control device, there can always be taken photographs which are accurately in focus to the remote control operator.

6 Claims, 2 Drawing Sheets

ACTIVE DISTANCE MEASURING APPARATUS WITH THE REMOTE CONTROL FUNCTION

This is a continuation of application Ser. No. 08/372,837 filed Jan. 13, 1995, which is a continuation of application Ser. No. 08/239,842 filed May 9, 1994, which is a continuation of application Ser. No. 07/835,322 filed Feb. 14, 1992, all now abandoned.

BACKGROUND OF THE INVENTION

1. Field of the Invention

This invention relates to an active distance measuring apparatus with the remote control function, and particularly to the technique of ensuring focusing to be accurately accomplished upon the operation of a remote control device in an active multipoint distance measuring apparatus used, for example, in a camera or the like to project a plurality of light beams onto a subject for distance measurement and effect distance measurement on the basis of the irregularly reflected light thereof.

2. Related Background Art

In order to enable even unskilled photographers to take well-focused photographs, there have heretofore been produced cameras provided with auto focus devices. Many of such cameras have the remote control function to effect release from positions far from the cameras.

Such auto focus devices include one of the multipoint distance measuring type which projects a light beam onto a plurality of locations within the photographing range and distance-measures the plurality of locations on the basis of the irregularly reflected light thereof and also determines an optimal in-focus position from the distance measurement data of each distance measuring point by a predetermined processing sequence.

Also, in such cameras equipped with the auto focus function and the remote control function, there has been proposed a camera in which the distance measuring optical path of a distance measuring apparatus is mechanically changed so as to detect the transmitted position of remote control signal light by exclusive position detecting means and accurately distance-measure an object which is the remote control operator (Japanese Laid-Open Patent Application No. 2-135310).

However, in the prior-art camera having the auto focus device and the remote control function, a light receiving element for auto focus and a light receiving element for remote control are discrete from each other, and this has led to the inconvenience that the apparatus construction of the camera becomes complicated.

Also, it is often the case with the photographing using remote control that the remote control operator is also photographed as an object. However, where photographing is effected by a camera of the aforedescribed prior-art multipoint distance measuring type, the remote control operator is not always judged as an optimal in-focus position under such a situation that there exist a plurality of objects in the image field, and this has led to the inconvenience that the resultant photograph is not in focus to the remote control operator.

Further, in the camera proposed in the aforementioned Japanese Laid-Open Patent Application No. 2-135310, a light receiving element discrete from a light receiving element for distance measurement has been necessary to detect the position of an object and further, it has been necessary to use a complicated mechanism in order to change the distance measuring optical path. There has also been the inconvenience that in the photographing using remote control, the remote control operator is always positioned at the center of the image field irrespective of the photographer's intention.

SUMMARY OF THE INVENTION

In view of the above-noted problems peculiar to the prior-art apparatus, an object of the present invention is to simplify the construction of an active distance measuring apparatus with the remote control function and to ensure a camera to be accurately focused on the remote control photographer during remote control photographing.

In order to solve the above-noted problems, in the present invention, a light receiving element for a remote control signal and the light receiving element of the active multipoint distance measuring apparatus are common to each other. Also, during the remote control photographing by the active multipoint distance measuring apparatus, distance measurement is effected by the use of only the light receiving element which has received the remote control signal, or use is made of the output of the light receiving element which has received the remote control signal and the output of the other light receiving elements, and the apparatus of the present invention is provided with a distance measuring mode in which the output of the light receiving element which has received the remote control signal is weighted and multipoint distance measurement is effected.

In the above-described construction, during remote control photographing, use is made of the output of the light receiving element which has received the remote control signal, or the output of said light receiving element and the output of the other light receiving elements, but multipoint distance measurement is effected by the use of the weighted output of the light receiving element which has received the remote control signal. Therefore, distance measurement is effected at the position of the remote control operator or with weight attached to the position of the remote control operator, and nobody will cause the problem that during remote control photographing, the camera is not in focus upon the remote control operator who is an object. Also, the light receiving element is used for both of the reception of the remote control signal and the light reception for distance measurement and the distance measuring position is electrically selected and therefore, the use of a complicated mechanism becomes unnecessary and thus, the construction of the apparatus is simplified and the realization of a low-cost apparatus becomes possible.

DESCRIPTION OF THE PREFERRED EMBODIMENTS

Figure 1:
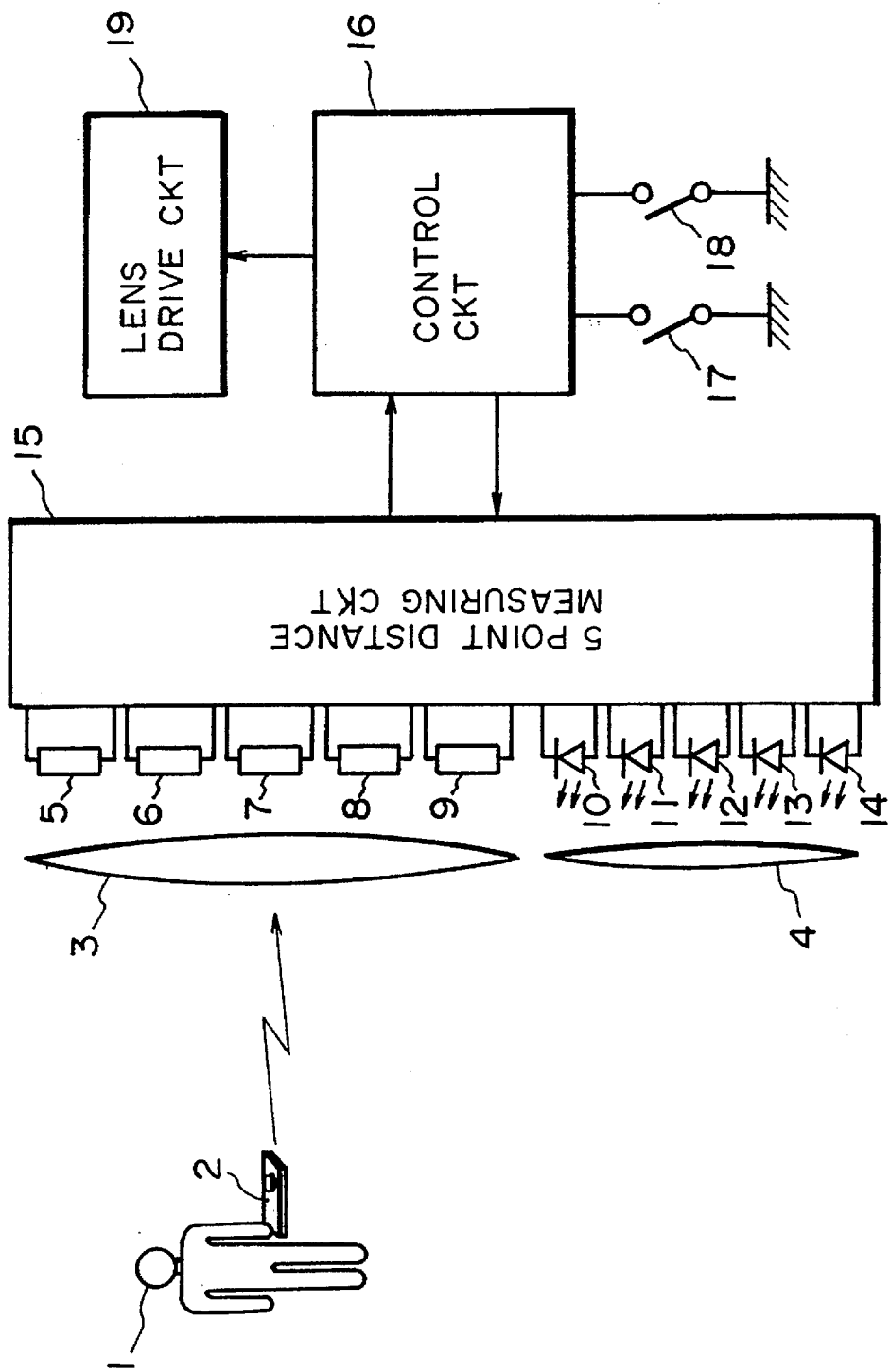
FIG. 1 is a block diagram schematically showing the construction of an active distance measuring apparatus with the remote control function according to an embodiment of the present invention.
Figure 2:
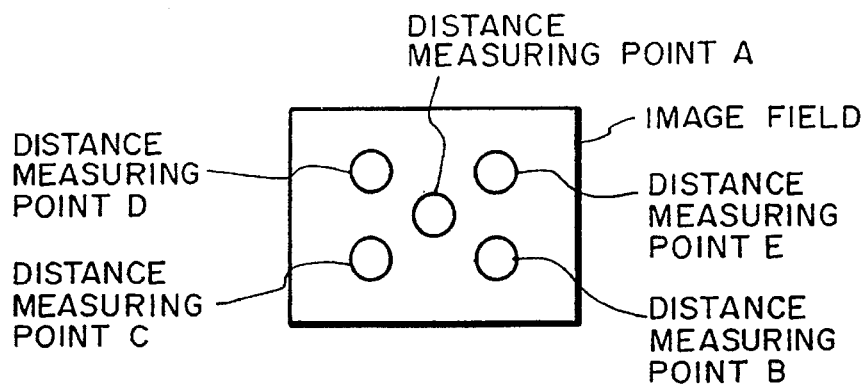
FIG. 2 is an illustration showing the positions of distance measuring points at which the apparatus of FIG. 1 effects distance measurement within the photographing image field.

An embodiment of the present invention will hereinafter be described with reference to the drawings. FIG. 1 schematically shows the construction of a camera provided with an active distance measuring apparatus with the remote control function according to an embodiment of the present invention. FIG. 2 shows the five distance measuring points of the camera of FIG. 1 at positions in the image field.

The camera of FIG. 1 is comprised of light emitting devices 10, 11, 12, 13, 14, a light projecting lens 4, a light receiving lens 3, light position detecting elements (PSDs) 5, 6, 7, 8, 9, a five-point distance measuring circuit 15, a control circuit 16, a remote control mode switch 17, a distance measuring mode switch 18, a lens drive circuit 19, etc.

Each of the light emitting devices 10, 11, 12, 13 and 14 is comprised, for example, of an infrared light emitting diode (IRED), and the light projecting lens 4 is disposed in front of these light emitting devices 10, 11, 12, 13 and 14. These light emitting devices 10, 11, 12, 13 and 14 are designed to project infrared light onto distance measuring points of an object field corresponding to points C, D, A, E and B, respectively, of an image field shown in FIG. 2.

The light receiving lens 3 is disposed in front of the light position detecting elements (PSDs) 5, 6, 7, 8 and 9, and is designed to receive the reflected light from the aforementioned distance measuring points C, D, A, E and B.

The five-point distance measuring circuit 15 processes photocurrents output from both ends of the PSDs in conformity with the positions of light points applied to the PSDs, obtains the distance data of the respective distance measuring points and transmits them to the control circuit 16. The PSDs 5, 6, 7, 8 and 9 act also as light receiving elements for a remote control signal, and one of the PSDs receives infrared signal light from a remote control transmitter 2 operated by a remote control operator 1, and the five-point distance measuring circuit 15 processes a signal from said PSD and sends a signal specifying the PSD which has received the remote control signal and a remote control signal such as a release signal to the control circuit 16.

Connected to the control circuit 16 are the five-point distance measuring circuit 15, the remote control mode switch 17, the distance measuring mode switch 18 and the lens drive circuit 19. The remote control mode switch 17 assumes a mode in which remote control is used when it is ON, and assumes a photographing mode in which remote control is not used when it is OFF. Also, the distance measuring mode switch 18 assumes a one-point distance measuring mode when it is ON, and assumes a five-point distance measuring mode when it is OFF. The lens drive circuit 19 drives a lens optical system to the in-focus position on the basis of a control signal from the control circuit 16. Although not shown, a release button, a shutter, etc. are connected to the control circuit 16 to perform a known photographing sequence operation.

The operation of the apparatus constructed as described above will hereinafter be described with respect, for example, to the situation shown in FIGS. 3 and 4.

Figure 3:
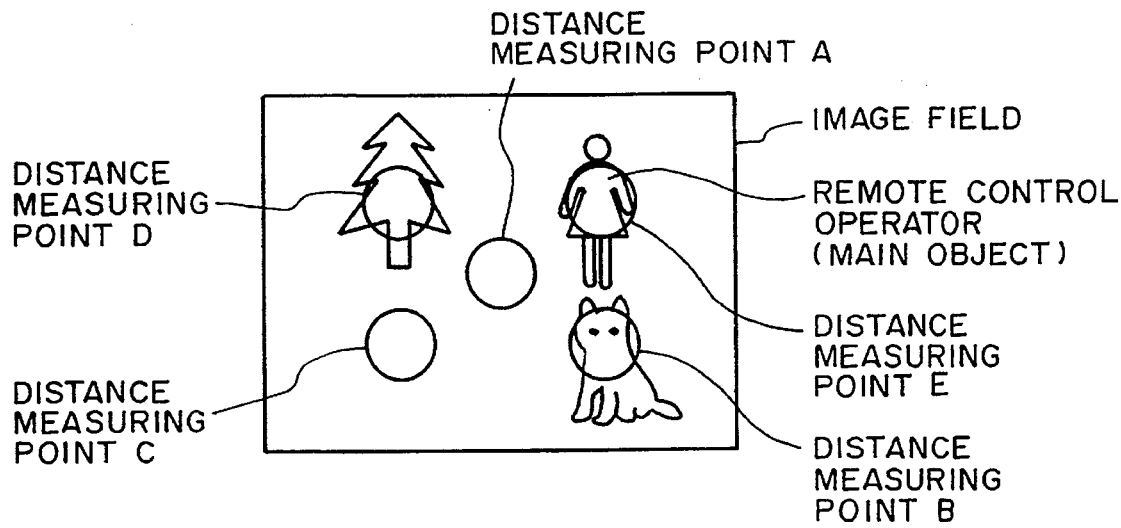
FIG. 3 is an illustration showing an example of the disposition of a photographed scene within the image field for illustrating the operation of the distance measuring apparatus according to the present invention.
Figure 4:
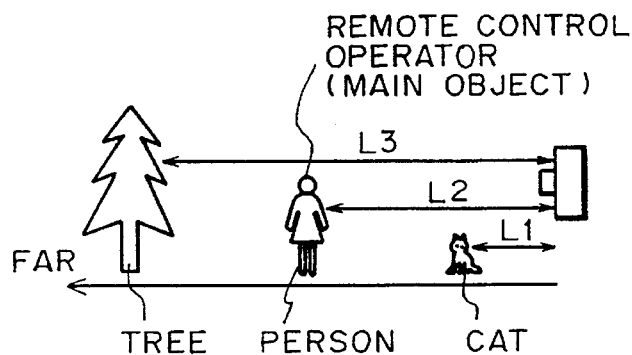
FIG. 4 is an illustration showing the distance relation of each object in FIG. 3 with the distance measuring apparatus.

FIG. 3 shows the relations between three objects (a person, a cat and a tree) and five distance measuring points in the image field. The main object is a person and is located at the distance measuring point E, and this person at the same time is the remote control operator. The cat and tree are located at the distance measuring points B and D, respectively. FIG. 4 shows the positional relation in the direction of distance between the objects in FIG. 3 and the camera, and the three objects are located at a distance L2 (person), a distance L1 (cat) and a distance L3 (tree), respectively.

A description will first be given of a case where in such a situation, the remote control mode switch 17 is OFF, i.e., a case where the release from the release button, not shown, is waited for.

In such case, assuming that the distance measuring mode switch 18 is OFF, the five-point distance measuring mode is assumed, and when the release button is depressed, preparations for photographing are first made at the half-depression stroke of the release button. The five-point distance measuring circuit 15 turns on the IREDs 10, 11, 12, 13 and 14, which thus apply infrared light to the objects. The IRED 13 applies infrared light to the person, the IRED 14 applies infrared light to the cat, the IRED 11 applies infrared light to the tree, and the PSDs 8, 9 and 6 receive the reflected light thereof, respectively. The infrared light of the other IREDs is applied to infinity and is not reflected back. The PSDs 8, 9 and 6 receive the reflected light from the respective distance measuring points and output to the five-point distance measuring circuit 15 output photocurrents conforming to the positions of the incident light points thereof. The five-point distance measuring circuit 15 calculates the signal from each PSD, obtains the distance measurement data of five points and transmits them to the control circuit 16. The control circuit 16 determines the optimal in-focus position from the distance measurement data of each distance measuring point by a predetermined processing sequence. In the case of the present embodiment, the distance at which the main object lies is judged from among the four distance data of the distances L1, L2, L3 and infinity by the aforementioned processing sequence and the in-focus position is determined. Also, a light metering circuit, not shown, measures the brightnesses of the objects. At the next full-depression stroke of the release button, the control circuit 16 sends a control signal to the lens drive circuit 19 on the basis of said in-focus position, and the lens drive circuit 19 drives a photo-taking lens to the in-focus position, whereafter a photographing operation is performed. In this case, the control circuit 16 determines the amount of axial movement of the lens and the amount of opening of the shutter from the already determined in-focus position and the brightnesses of the objects, effects focusing through the lens drive circuit 19 and effects aperture adjustment, and thereafter performs an exposure operation.

Next, when the distance measuring mode switch 18 is ON, there is brought about a one-point distance measuring mode in which, for example, only the distance measuring point A is distance-measured. In this case, the above-described five-point distance measurement changes to one-point distance measurement. That is, only the IRED 12 is turned on, and the distance measurement data of the distance measuring point A is obtained from the signal from the PSD 7. By the use of the one-point distance measurement data thus obtained, the in-focus position is determined as in the case of the above-described five-point distance measurement. In the case of FIG. 3, no object is present at the distance measuring point A and therefore, usually, by the use of so-called focus lock, focusing is effected in advance to the distance L2 at which the main object (person) is present, and then photographing is effected.

A description will now be given of a case where the remote control mode switch 17 is ON, i.e., a case where the camera is waiting for the signal from the remote control transmitter 2.

First, in the case of the five-point distance measuring mode in which the distance measuring mode switch 18 is OFF, for example, the remote control operator lying at the distance measuring point E operates the remote control transmitter 2 and transmits a remote control signal, whereupon the PSD 8 receives this remote control signal light. The five-point distance measuring circuit 15 discriminates the received signal, and if it recognizes that the received signal is the signal from the remote control transmitter 2, a remote control signal such as a release signal is sent from the five-point distance measuring circuit 15 to the control circuit 16. Thereafter, as in the aforedescribed case where the remote control mode switch is OFF and the five-point distance measuring mode is selected, five-point distance measurement and photometry are effected and an exposure operation is performed in response to the half-depression and full-depression of the release button.

In contrast, when the distance measuring mode switch 18 is closed and the camera is set to the one-point distance measuring mode, the five-point distance measuring circuit 15 as described above, receives the signal from the PSD 8 which has received the remote control signal, and discriminates whether this signal is that by the remote control signal light or that by the reflected light of the light from the IRED for distance measurement. This discrimination can be accomplished, for example, by the intensity or wavelength or the like of the received signal light. In this case, said signal is discriminated as the signal by the remote control signal light, and the five-point distance measuring circuit 15 sends to the control circuit 16 a signal informing that the PSD which has received the remote control signal is PSD 8 and a remote control signal such as a release signal. The control circuit 16 which has received these signals judges that the remote control operator (the main object) lies at the distance measuring point E corresponding to the PSD 8, and sends a command to the five-point distance measuring circuit 15 so as to turn on the IRED 13. In response to this command, the five-point distance measuring circuit 15 turns on the IRED 13 and receives a signal from the PSD 8 which has received the reflected light from the main object lying at the distance measuring point E. The five-point distance measuring circuit then calculates this signal from the PSD 8, finds the distance data L2 of the main object and transmits it to the control circuit 16. Thereafter, as in the above-described other case, an exposure operation is performed.

In the apparatus described above, the mode is set to the remote control mode and is further set to the one-point distance measuring mode, whereby only the location at which the remote control operator lies is distance-measured, and this leads to the advantage that in remote control photographing, a photograph well-focused on the remote control operator can always be taken. Also, the light receiving element for multipoint distance measurement is used also as the light receiving element for remote control and the detection of the position of the remote control operator is effected by the selection of the light receiving element and therefore, as compared with the prior-art system which has a light receiving element for remote control discretely and detects the position of the remote control operator by mechanically changing the distance measuring optical path, the apparatus of the present invention is greatly simplified in construction and becomes easy to assemble and adjust.

Another embodiment of the present invention will now be described.

In this embodiment, as in the aforedescribed embodiment, the apparatus construction used is that shown in FIGS. 1 and 2. Also, the design can be such that in a case where the remote control mode switch 17 is OFF and a case where the remote control mode switch is ON and the distance measuring mode switch 18 is OFF, i.e., the case of the five-point distance measuring mode, the same operation as that of the aforedescribed embodiment is performed.

The operation in a case where the remote control mode switch 17 is ON and the distance measuring mode switch 18 is OFF, i.e., the case of the five-point distance measuring mode, will hereinafter be described with respect to the photographing situation shown in FIGS. 3 and 4.

That is, when the remote control operator lying at the distance measuring point E operates the remote control transmitter 2 and transmits remote control signal light, the PSD 8 receives this remote control signal light. The five-point distance measuring circuit 15 discriminates the received signal and when it recognizes that it is a signal from the remote control transmitter 2, the five-point distance measuring circuit sends to the control circuit 16 a signal informing that the PSD which has received the remote control signal is PSD 8 and a remote control signal such as a release signal. The control circuit 16 which has received these signals judges that the remote control operator (the main object) lies at the distance measuring point E, and then sends a command to the five-point distance measuring circuit 15 so as to effect five-point distance measurement.

In response to this command, the five-point distance measuring circuit 15 turns on the IREDs 10, 11, 12, 13 and 14, and receives signals from the PSDs 5, 6, 7, 8 and 9 which have received the reflected light from the distance measuring points C, D (tree), A, E (person) and B (cat), respectively. The five-point distance measuring circuit 15 then calculates these signals, obtains distance data L1, L2, L3 and infinity and transmits them to the control circuit 16. The control circuit 16 determines the optimal in-focus position from these distance data by a predetermined processing sequence which has weighted the distance data L2 of the main object. Thereafter, as previously described, the light metering circuit, not shown, measures the brightnesses of the objects, and subsequently a photographing operation is performed. In this case, the control circuit 16 determines and controls the amount of axial movement of the lens and the amount of opening of the shutter from the already determined in-focus position and the brightnesses of the objects and performs an exposure operation.

In the above-described apparatus, multipoint distance measurement including the location at which the remote control operator is present is effected and the in-focus position is determined by a processing sequence which has weighted the position of the remote control operator and therefore, there is the advantage that in remote control photographing, not only optimal focusing is always accomplished upon the remote control operator, but also a photograph taking the other objects than the remote control operator also into consideration can be taken.

While the above embodiments have been described with respect to a case where distance measurement and the remote control operation are performed by the use of infrared light, the present invention is not restricted to the use of infrared light but is also applicable to a case where for example, ultrasonic wave or the like are used. It is also possible to provide a multipoint light metering circuit for light-metering the points at which multipoint distance measurement is being effected, and make such design that the multipoint light metering circuit is operatively associated with the aforedescribed multipoint distance measuring circuit to light-meter the remote control operator, whereby there can be taken a photograph which is not only in focus to the remote control operator, but also is in accord with the remote control operator in exposure.

As described above, according to the present invention, it becomes possible to take a photograph which is appropriately in focus to the remote control operator or accurately in focus to the remote control operator with the in-focus to the other objects than the remote control operator being added, during remote control photographing, by a very simple mechanism and circuit construction.

What is claimed is:

1. An active distance measuring apparatus with a remote control function, characterized by the provision of:

a plurality of light projecting portions for projecting light to corresponding points of an object field;

a plurality of light receiving portions capable of receiving projected light reflected from the corresponding points, respectively, of the object field and also capable of receiving signal light from a remote control transmitter at the corresponding points, respectively, of the object field;

a distance measuring circuit connected to said light projecting portions and said light receiving portions for effecting active distance measurement to points in the object field by the use of the corresponding light projecting portions, respectively, and the corresponding light receiving portions, respectively, said distance measuring circuit being responsive to signal light received by one of said light receiving portions and outputting a discrimination signal for discriminating which one of said plurality of light receiving portions has received said signal light; and a control circuit which receives said discrimination signal for judging that said remote control transmitter is located at a point of said object field corresponding to said one light receiving portion, and, based on said judging, which outputs to said distance measuring circuit a command signal;

said distance measuring circuit being responsive to said command signal for causing only one of said light projecting portions corresponding to said one light receiving portion to project light to the corresponding point of said object field at which said remote control transmitter is located, in order to measure distance thereto.

2. An active distance measuring apparatus according to claim 1, wherein said distance measuring circuit discriminates whether light received by a light receiving portion is signal light from said remote control transmitter or light from a light projecting portion reflected from said object field.

3. An active distance measuring apparatus according to claim 2, wherein the discrimination is performed based on one of a difference in intensity of received light and a difference in wavelength of received light.

4. An active distance measuring apparatus with a remote control function characterized by the provision of:

a plurality of light projecting portions for projecting light to corresponding points of an object field;

a plurality of light receiving portions capable of receiving projected light reflected from the corresponding points, respectively, of the object field and also capable of receiving signal light from a remote control transmitter at the corresponding points, respectively, of the object field;

a distance measuring circuit connected to said light projecting portions and said light receiving portions for effecting active distance measurement to points in the object field by the use of the corresponding light projecting portions, respectively, and the corresponding light receiving portions, respectively, said distance measuring circuit being responsive to signal light received by one of said light receiving portions and outputting a discrimination signal for discriminating which one of said plurality of light receiving portions has received said signal light; and a control circuit which receives said discrimination signal for judging that said remote control transmitter is located at a point of said object field corresponding to said one light receiving portion, and, based on said judging, which outputs to said distance measuring circuit a command signal;

said distance measuring circuit being responsive to said command signal for causing light projecting portions, including a light projecting portion corresponding to said one light receiving portion, to project light to corresponding points of said object field in order to measure distances thereto, to weight distance measurement to said point at which the remote control transmitter is located and to produce a distance measurement output.

5. An active distance measuring apparatus according to claim 4, wherein said distance measuring circuit discriminates whether light received by a light receiving portion is signal light from said remote control transmitter or light from a light projecting portion reflected from said object field.

6. An active distance measuring apparatus according to claim 5, wherein the discrimination is performed based on one of a difference in intensity of received light and a difference in wavelength of received light.

* * * * *